US009623914B2

United States Patent
Grosse-Plankermann et al.

(10) Patent No.: US 9,623,914 B2
(45) Date of Patent: Apr. 18, 2017

(54) COVERING SYSTEM FOR AN INTERIOR SPACE OF A VEHICLE, A METHOD FOR COVERING A REGION OF AN INTERIOR SPACE OF A VEHICLE, AND A VEHICLE WITH AN INTERIOR SPACE, WHICH IS COVERED BY THE COVERING SYSTEM IN AT LEAST SOME REGIONS

(75) Inventors: Peter Grosse-Plankermann, Neu Wulmstorf (DE); Dieter Plehn, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 337 days.

(21) Appl. No.: 13/599,932

(22) Filed: Aug. 30, 2012

(65) Prior Publication Data
US 2013/0048785 A1 Feb. 28, 2013

Related U.S. Application Data

(60) Provisional application No. 61/529,643, filed on Aug. 31, 2011.

(30) Foreign Application Priority Data

Aug. 31, 2011 (DE) .......................... 10 2011 111 864

(51) Int. Cl.
*B62D 25/20* (2006.01)
*B64C 1/18* (2006.01)

(52) U.S. Cl.
CPC ................. *B62D 25/20* (2013.01); *B64C 1/18* (2013.01)

(58) Field of Classification Search
CPC .................................. B62D 25/20; B64C 1/18

USPC .................................................. 244/119, 131
See application file for complete search history.

(56) References Cited

U.S. PATENT DOCUMENTS

| | | | | |
|---|---|---|---|---|
| 4,050,208 A * | 9/1977 | Pompei et al. | ................. | 52/460 |
| 4,507,011 A * | 3/1985 | Brown | .......................... | 403/404 |
| 5,065,960 A * | 11/1991 | Castellucci | ................... | 244/131 |
| 6,276,866 B1 * | 8/2001 | Rutan | ........................... | 403/375 |
| 6,655,635 B2 * | 12/2003 | Maury et al. | ................. | 244/131 |
| 7,530,531 B2 * | 5/2009 | Wood et al. | ............... | 244/129.3 |
| 7,784,799 B2 | 8/2010 | Etling | | |

(Continued)

FOREIGN PATENT DOCUMENTS

| | | |
|---|---|---|
| DE | 718224 A | 3/1942 |
| DE | 102007062747 A1 | 7/2009 |

OTHER PUBLICATIONS

German Patent Office, Office Action for Application No. 10 2011 111 864.4 Dated Jun. 13, 2013.

(Continued)

*Primary Examiner* — Brian M O'Hara
*Assistant Examiner* — Keith L Dixon
(74) *Attorney, Agent, or Firm* — Lorenz & Kopf, LLC (57) ABSTRACT

A covering system for an interior space of a vehicle comprises at least one surface element and at least one sealing element. The surface element comprises an upper surface and at least one bounding edge extending at an angle to the upper surface. The surface element furthermore comprises at least one recess, which runs at least adjacent to the bounding edge. The sealing element has an extent corresponding at least partly with the at least one bounding edge, and a shape corresponding at least partly with the recess of the surface element.

17 Claims, 7 Drawing Sheets

(56) References Cited

U.S. PATENT DOCUMENTS

2009/0166472 A1    7/2009  Kook et al.
2010/0170994 A1*   7/2010  Burns et al. .................. 244/130
2010/0320325 A1*  12/2010  Parikh et al. ................. 244/130

OTHER PUBLICATIONS

German Patent Office, German Office Action for Application No. 10 2011 111 864.4 Dated May 27, 2016.

* cited by examiner

COVERING SYSTEM FOR AN INTERIOR SPACE OF A VEHICLE, A METHOD FOR COVERING A REGION OF AN INTERIOR SPACE OF A VEHICLE, AND A VEHICLE WITH AN INTERIOR SPACE, WHICH IS COVERED BY THE COVERING SYSTEM IN AT LEAST SOME REGIONS

CROSS-REFERENCE TO RELATED APPLICATIONS

This application claims priority to German Patent Application No. 10 2011 111 864.4, filed Aug. 31, 2011 and to U.S. Provisional Patent Application No. 61/529,643, filed Aug. 31, 2011, which are incorporated herein by reference in their entirety.

TECHNICAL FIELD

The technical field relates to a covering system for an interior space of a vehicle, a method for covering a region of an interior space of a vehicle, and a vehicle with a vehicle body and an interior space formed therein, which is covered by the covering system in at least some regions.

BACKGROUND

Vehicles that serve to transport objects and passengers usually have an interior space that is bounded by a body or a frame structure and is utilized with the aid of covering elements. The latter are embodied in the form of floor panels, side lining elements, side walls and ceiling elements, which are attached to the body or frame structure. In a passenger cabin of a vehicle, floor panels are subjected to constant loading, which is brought about as a result of access movements, moisture, contamination and the elastic deformations that regularly occur during operation of the vehicle. To protect floor panels from damage these are laid spaced apart from one another with the formation of gaps in the body or frame structure, so that the elastic movements of the vehicle do not lead to impact loadings on lateral bounding edges of the floor panels. The gaps that are present over the whole surface of the floor are sealed by means of a sealing compound so as to prevent the entry of fluids or contamination into regions located underneath the floor. Furthermore the sealing serves to prevent as far as possible any indiscriminate fluid connection between spaces in vehicles that are climatically separated from one another.

Floor panels in passenger aircraft are, for example, of known art from DE 10 2007 062 747 A1 and US 20090166472 A1.

In the configuration of cabin flooring in passenger aircraft a tape is often used to seal a gap between floor panels; this lines a lateral bounding surface of the floor panels after they have been bolted into position, after which a sealing compound is applied around the entity. Before it is applied the sealing compound is in a very viscous fluid or pasty state in the first instance; after a sufficiently long curing time in the gap this passes into an elastic solid state. The sealing and curing procedures are thus associated with the expenditure of a considerable amount of time. During the production of the vehicle access to the floor is to be avoided totally over this period of time, such that all other installation tasks within the cabin must be interrupted.

If a floor panel or another surface element with this type of sealing is to be removed, for example for reasons of maintenance or repair tasks, the sealing compound must be broken out of the gap by means of the inlaid tape and removed from both the floor panel and also all adjacent frame structure surfaces. This also causes a significant expenditure of time. In addition, other objects, desirable features and characteristics will become apparent from the subsequent summary and detailed description, and the appended claims, taken in conjunction with the accompanying drawings and this background.

SUMMARY

Accordingly the sealing of gaps between floor panels and other surface elements are generally associated with a significant expenditure of time, for both the mounting of the seal and also its removal.

According to various exemplary embodiments, the present disclosure provides a covering system to cover a region of an interior space of a vehicle, which either reduces these disadvantages, or eliminates them entirely. In one example, the present disclosure provides a covering system, in which the sealing of gaps between surface elements, or between surface elements and a vehicle structure, can be manufactured as quickly as possible and quickly removed.

The covering system for a vehicle according to the various exemplary embodiments of the present disclosure comprises at least one surface element and at least one sealing element. The surface element comprises an upper surface and at least one bounding edge extending at an angle to the upper surface. The surface element furthermore comprises at least one recess, which runs at least adjacent to the bounding edge. The sealing element comprises an extent at least partly corresponding with the at least one bounding edge, and a shape corresponding with the recess of the surface element in at least some regions.

In the context of the present disclosure a surface element is to be seen as a planar component that is suitable for the purpose of covering a floor, wall or ceiling surface of a vehicle. Here the covering procedure in one example can comprise the attachment of a surface element to a body or frame structure so as to form a floor area, a side wall, a ceiling or another spatial boundary. In a simple case the surface element is a planar panel, which is embodied, for example, as a floor panel, or a ceiling panel. Alternatively the surface element may also be a side lining element, which may line a body section of a vehicle that has a shape that is not planar, or only partly planar, for example, a curved fuselage structure of an aircraft. In principle surface elements can fulfill both what are predominantly mechanical tasks, such as the introduction of loads into a body or frame structure, and also rather more visual tasks for purposes of achieving an attractive appearance.

A sealing element is to be seen as a component that is equipped for the purpose of bringing about a sealing action between a bounding edge of a surface element and a directly adjacent surface or edge. The sealing element is realized as a static, contacting seal. With a shape corresponding with that of a recess, this signifies technically that the sealing element may fit substantially snugly such that with an appropriate selection of material sufficient surface contact ensues and thus a sufficient sealing action. The purpose of an extent corresponding with the at least one bounding edge is that in the context of the present disclosure one or a plurality of sealing elements may be deployed so as to cover at least partly the gaps adjacent to the bounding edges of the surface element, which extend along the bounding edges of the surface element. Here a single sealing element need not cover the full length of the bounding edges, but rather a plurality of sealing elements may also be deployed, each of which only extends partly along a bounding edge, but in their totality encompass the whole periphery of the surface element.

As a result of using a recess the surface element does not have completely smooth, i.e., planar, upper and bounding surfaces with an uninterrupted plane of extent, but instead presents, depending upon the shape of the recess, a certain discontinuity, with the aid of which a sealing action is improved, since the sealing element can fit into, or fit substantially snugly into, a recess. The recess is to be understood as a depression that extends into the surface element from an outer bounding surface of the surface element. Here the bounding surface stands for any surfaces that bound an extent of the surface element, and thereby comprise visible and invisible upper surfaces in just such a manner, such as margins or edges. The recess should be arranged at a location that is generally close to the gap. Accordingly, it is appropriate to position the recess as close as possible to the bounding edge, without affecting the integrity of the bounding edge itself. In this context it is conceivable to arrange the recess at a certain small separation distance from the bounding edge, or to locate it directly in the bounding edge. In one example, the recess can be arranged on the surface element such that it forms a closed periphery.

In one of various exemplary embodiments, the recess of the surface element is arranged on its upper surface in a marginal region adjacent to the at least one bounding edge. Here the upper surface is seen as the surface that in the subsequent use of the surface element is facing towards an interior space of a vehicle, is thus exposed to the direct mechanical loading and contamination, and thus forms an effective surface. The upper surface defines the primary extent, or plane of extent, of the surface element, while the bounding edge simply defines its necessary thickness, or a necessary depth profile. A marginal region is furthermore seen as a region directly at or near the bounding edge, in or on the upper surface, which is embodied as a marginal strip on the upper surface of the surface element. The marginal region may, for example, have an extent on the upper surface of about 1 to about 10 cm, which enables a recess to be located such that the bounding edge remains undamaged; however, a part of a sealing element engaging in the recess can still lie securely on the surface element. The advantage of such an arrangement lies in the fact that the sealing element already covers a part of the upper surface of the surface element, so that a gap formed at the bounding edge is better protected by the overlap thereby arising, from contamination and the entry of fluids, and moreover an improved resistance to pressure is ensured with reference to the formation of a boundary for an air-conditioned zone within a vehicle.

In one of various exemplary embodiments, the sealing element comprises a flat, planar shape, wherein on a sealing surface to be directed towards the upper surface of the surface element, a projection that is shaped in a manner corresponding to the recess is arranged. The latter is set up for the purpose of engaging in the recess. As presented above, by arranging a recess on the upper surface a gap emanating from an upper surface of the surface element can be sealed. The correspondingly shaped projection leads to a seal that is further improved, since a form fit to be obtained by this means between the sealing element and the surface element represents a secure barrier to the passage of fluids, such as liquids or air. Fluids must move along the sealing surface to the projection, and must progress through the recess from one side of the projection to the other, if they are to be able to enter the gap at all.

The recess is generally embodied as a groove or channel, which is identified in terms of an essentially straight extent that runs, for example, parallel to a bounding edge, and is furthermore generally simple to produce. The geometric shape of the base of the groove or channel of the surface element may be produced as a function of the material used in the sealing element and its ability to be shaped. For example, rectangular groove bases, or bases having lateral chamfers, may be manufactured generally simply with the aid of shaft millers.

In addition, in accordance with one of various exemplary embodiments, the recess is embodied as a step in the marginal region of the surface element, such that the sealing element inserted into the recess lies flush with the surface of the surface element. In these circumstances the step generally comprises a depth that correlates with the thickness of a flat part of the sealing element.

In one of various exemplary embodiments of the present disclosure, the recess comprises an undercut, and the sealing element projection comprises a widening shape that corresponds with the recess in that the sealing element projection is snappable into the recess by utilizing the elasticity of its material. Thus when the sealing element is pressed into the surface element a form fit connection is already produced between the sealing element and the surface element; in addition this may be further improved by means of a self-adhesive layer on the sealing surface, or similar. The undercut has the additional advantage that the pure sealing action is already improved by the profile of the recess. To improve the sealing action further the dimensions of the sealing element projection may exceed the dimensions of the recess somewhat, such that a certain clamping action is brought about in the recess. In principle an undercut may, for example, be achieved using a dovetail-milling cutter; however, the latter must either traverse along the full extent of the surface element, or must traverse inwards into the surface element from at least one bounding edge, and must traverse outwards from the surface element once again.

According to one of various exemplary embodiments of the present disclosure, the surface element comprises attachment holes to allow the passage of means of attachment, such as screws, bolts, clamps or similar, wherein the at least one recess is arranged in a region between the attachment holes and a bounding edge of the surface element that is in each case adjacent. Attachment holes may, for example, be arranged distributed around the complete periphery of the surface element, so that a sufficiently secure attachment of the surface element is ensured, and weight and inertial forces and, in the event that the surface elements are used as floor panels, mechanical impacts, may be sufficiently safely directed into a body or frame structure. In order that the integrity of the surface elements is not mechanically affected by the attachment procedure, the attachment holes are arranged at a certain, predetermined separation distance from the respective bounding edge. During the process of clamping the means of attachment in the attachment holes any crushing or compression may be avoided, furthermore a sufficiently large separation distance allows sufficient space for the insertion of bushings or similar. A marginal region of the surface element, which extends from the bounding edge to the means of attachment, may be mechanically reinforced by suitable measures such that it can accommodate sufficiently the forces resulting from the means of attachment. For example, the marginal region may include a more solid material than the remaining part of the surface element.

In one of various exemplary embodiments, the recess of the sealing element is arranged in the bounding edge. The bounding edge, which runs at an angle to the upper surface, forms a lateral boundary of an adjacent gap, so that a recess running directly in the bounding edge can accommodate a sealing element running directly in the gap. Here the term "at an angle" signifies a non-parallel arrangement of the bounding edge relative to the upper surface of the surface element, wherein, for example, angles in a range between about 30 and about 90° lend themselves. A sealing surface of the sealing element is accordingly to be seen as a surface that fits snugly into the recess.

In one of various exemplary embodiments, the recess comprises a concave shape. By this means a sealing element that is introduced into this recess, which is located in a bounding edge of the surface element is prevented from slipping out along the bounding edge. If the sealing element is subjected to pressure on one side, the sealing element can be pressed against an outer edge of the concave recess, as a result of which an improvement of the sealing action on the recess takes place under the action of the pressure.

According to another of various exemplary embodiments, the sealing element in addition comprises a circular cross-section in at least some regions, the curvature of which correlates closely with the curvature of the recess. By this means the sealing element may be well supported in the recess arranged directly on the bounding edge, and does not slip backwards and forwards in the recess. In one example, the sealing element can have an oval or elliptical shape so as to create a larger sealing surface onto the bounding edge, and furthermore to effect a reduction in the movability of the sealing element.

In one of various exemplary embodiments of the present disclosure, the sealing element may comprise a hollow profile. In addition to the weight advantages for deployment in an aircraft, for example, the sealing element is furthermore very compressible and can also be inserted into a gap under compression. With a suitable selection of material the sealing element will attempt to expand once again, so that a compressed sealing element opens out again in the gap on the bounding edge and thus fits snugly into the recess.

According to another of various exemplary embodiments of the present disclosure, the sealing element can be rolled-up in the form of a strip; this is generally simple to produce and nevertheless has a high reliability. A rolled-up strip is usually attempting to unroll itself again; in the case of a sealing element located in a gap this would lead it to fit snugly against the surfaces bounding the gap, and thus to bring about an improved sealing action.

In one example, a sealing element comprises, for purposes of bridging over gaps of frame structures, a projection or an extension, which furthermore can be configured so as to be self-adhesive. From a sealing element inserted in a gap the projection or extension may extend, for instance, up to a structural component, onto which the abutting end is adhesively bonded.

In one of various examples, the sealing element is formed from an elastic material, such as an elastomer or another suitable rubber-like material. By this means it is furthermore also possible to compensate for deviations in size of surface elements, deviations in the dimensions of gaps or other geometrical dimensions, in that the sealing element is subjected to an elastic extension.

In one of various exemplary embodiments, the sealing surface is furthermore embodied so as to be self-adhesive. In the event of mechanical loading of the sealing element either the form fit between the projection and the recess arranged on the upper surface may be maintained, or a durable snug fit of the sealing element in the recess in a lateral bounding edge may be achieved, with the end result being that the sealing action is improved still further.

In the interests of a substantially flexible deployability of the covering system according to the present disclosure, sealing elements may be available as continuous lengths to be cut to the desired size on site, and also as finished sealing elements of predetermined lengths, or predetermined planar extents in the form of a grid. Moreover, when using hollow profiles the insertion of bushings may lend itself to the connection of individual segments; these connect two adjacent sections of sealing elements with one another. The bushings generally comprise dimensions that allow the bushing to be inserted into the profile of the sealing element. Two adjacent sealing elements may in this manner be positioned flush with one another, and may be connected via a bushing that is connecting the ends and is generally self-adhesive. For purposes of forming sections of a sealing element that are to be arranged at corners of surface elements, different materials may be deployed. For this purpose elastic plastics lend themselves as moulded parts, which are implemented, for example, as injection moulded parts, and can form sharper contour transitions. In general care is to be taken that for purposes of improving the economics as little waste as possible is generated when cutting the sealing elements to length.

The covering system according to the present disclosure may also be modified in that instead of a recess on the surface element other means of positioning, means of retention, means of guidance, or means of attachment are deployed; in combination with an appropriately configured sealing element these may produce a reliable seal that may be mechanically loaded. For example a means of retention in the form of a projection or extension may be located on the sealing element, which is directly inserted into a gap on a surface element. Both sides of the sealing element may also comprise a projection or an extension. When the sealing element is inserted this projection abuts against a lateral bounding edge of the surface element. Here the lateral bounding edge may be embodied without a recess and completely planar, since by pressing the sealing element with a projection or extension against the lateral bounding edge, on the one hand a high level of static friction may be achieved, and on the other hand a strong barrier effect for fluids, contamination or similar. The means of retention can on the other hand be implemented in the form of a projection on a lateral bounding edge, which projects into a correspondingly formed depression of a sealing element. Use of means of retention on both the surface element and also the sealing element in combination may also be advantageous, for example when introducing the sealing element into a gap that lies between a structural component and a surface element. Here the structural component comprises what is usually a smooth surface, while the surface element may comprise a recess or a projection, or alternatively a smooth bounding surface also. The sealing element may accordingly on one side or on two sides comprise in each case at least one projection or a depression or other means of retention.

According to various exemplary embodiments of the present disclosure, also provided is a method for the manufacture of at least one part of an interior space of a vehicle, which comprises the laying down of at least one surface element onto a frame structure, the attachment of the surface element to the frame structure with the formation of at least one gap relative to adjacent objects, and the mounting of a sealing element on the margin of the surface element so as to bridge the gap. Here the mounting of the sealing element can furthermore be preceded by the cutting to length or preparation of a sealing element. The sealing element can be available in a plurality of sealing element sections, which are arranged flush with one another. In an alternative exemplary embodiment when using sealing elements with hollow profiles and other connecting elements such as adhesive bushings and moulded parts, a peripheral sealing element may be manufactured. The mounting of the sealing element on the margin of the surface element may also alternatively be undertaken before the step of laying down and attachment of the surface element to the frame structure.

In addition, according to various exemplary embodiments, provided is a vehicle with an interior space that is covered by the covering system in at least some regions. In one example, the vehicle is embodied as an aircraft, which has at least one interior space. One interior space may be embodied as a passenger cabin, with a further interior space, for example, embodied as a freight compartment. The surface elements may refer to both floor elements, and also side, freight compartment or ceiling lining elements.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 2a to FIG. 2h shows an exemplary embodiment of the covering system according to the present disclosure in various cross-sectional representations, and in a plan view onto a surface element;

FIG. 3a to FIG. 3c shows a further exemplary embodiment of the covering system according to the various principles of the present disclosure;

FIG. 4a to FIG. 4c shows a further exemplary embodiment of the covering system according to the various principles of the present disclosure;

FIG. 5a to FIG. 5c shows a further exemplary embodiment of the covering system according to the various principles of the present disclosure;

FIG. 6a to FIG. 6f shows further variations of exemplary sealing elements with closed cross-sections for use in an covering system according to the various principles of the present disclosure;

FIG. 7a to FIG. 7f shows in plan views an exemplary sealing element arrangement with hollow profiles and further connecting elements;

FIG. 8a to FIG. 8d shows in plan views an exemplary subdivision of sealing elements of planar design.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
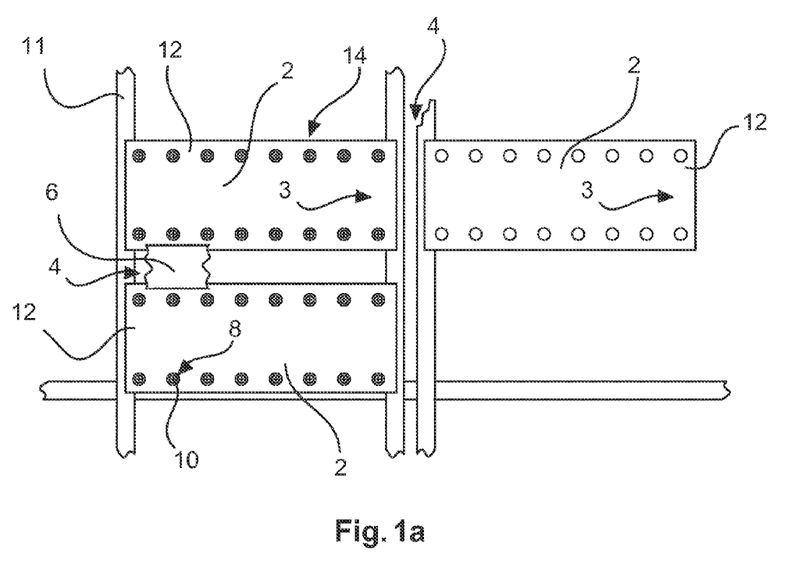
FIG. 1a and FIG. 1b show sequential work operations for a floor surface in a vehicle, manufactured with an exemplary covering system.

FIG. 1a shows an arrangement of surface elements 2 in the course of construction; these are arranged adjacent to one another with the formation of gaps 4 relative to one another. The gaps 4 are sealed with the aid of sealing elements 6. FIG. 1a shows only one segment of a sealing element 6 represented in an exemplary manner, so as to represent in at least a purely qualitative manner the panel structure that can be achieved by means of the covering system of the present disclosure with an arrangement of sealing elements 6. It is self-evident that all gaps 4 are completely covered by means of peripheral sealing frame profiles.

The surface elements 2 are attached to a frame structure 11 via means of attachment 8. The means of attachment 8 extend through attachment holes 10 from an upper surface A through the total thickness of the surface elements, wherein the attachment holes are generally aligned along a closed line of hole centres 12. The line of hole centres 12 generally runs parallel to bounding edges 14 of the surface elements 2, and is spaced at a distance from the latter such that the attachment holes 10 are securely arranged, that is to say, without any potential damage to an edge region of the surface element. The respective surface element 2 is equipped such that a sealing element 6 can be positioned as flush as possible on the former, without having to resort to conventional methods involving the curing of a pasty sealant in order to administer a sufficient sealing action for the purpose of sealing the gaps 4. In the exemplary embodiment shown after the attachment of the surface element 2 to the frame structure 11 the sealing element 6 is positioned over the gap 4 and applied to surface elements 2 located next to one another. Alternatively, a prior mounting of a peripheral sealing frame (formed from sealing elements 6) is also possible.

Figure 1B:
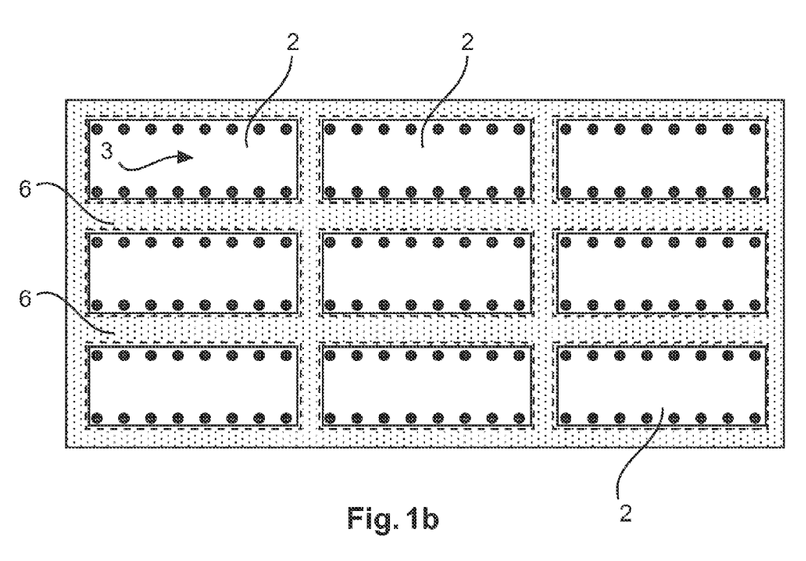

As is shown in FIG. 1b in terms of a complete surface structure, a plurality of surface elements 2 may be made up to form a sealed surface of any size in practice, in which all gaps are closed up by means of peripheral sealing elements 6. Such surfaces may bound passenger cabins of vehicles and thereby may, for example, form a cabin floor, a cabin side wall, a cabin ceiling, a freight compartment floor, a freight compartment wall, a freight compartment ceiling, and similar.

Figure 2A:
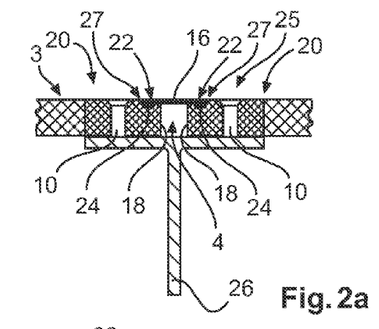

FIG. 2a shows two surface elements 20 arranged next to one another, which have bounding edges 18 directed towards one another. Between the bounding edges 18 is located a gap 4, which in a vehicle generally serves the purpose of protecting the bounding edges 18 from impacting one another in the event of regularly occurring, elastic vehicle movements. In this context vehicle movements are intended to include mechanical alterations to the shape of the vehicle structure, which may usually occur during normal deployment of the vehicle. The gap 4 is covered with a sealing element 16, which has a planar form with two projections 22 spaced apart from one another; these are shaped in a manner corresponding to recesses 24 arranged in the marginal regions 25 of the surface elements. The marginal region is to be seen as a region of the surface element 20 that lies between attachment holes 10 and bounding edges 18. This marginal region may be specially reinforced within the surface elements 20 so as to prevent a breakout of a hole 10 or a means of attachment 8, wherein at the same time a generally secure seating of the projection 22 in the recess 24 can be ensured by means of such a reinforcement.

In addition the recess 24 is generally designed as a step 27, which enables the sealing elements 16 to be laid down flush with the surface.

By the introduction of two projections 22 spaced apart from one another into two recesses 24 of two adjacent surface elements 20, the gap 4 that is located between the latter is completely covered. Fluids or contaminants that migrate from the surface elements 20 towards the gap 4, would be prevented by the sealing element 16 on the surface elements from migrating into the gap 4. A fluid would firstly have to migrate underneath a marginal region of the sealing element 16, in order then to flow around the projection 22, and through the recess 24, so as to reach the gap 4 at all. In addition to the good sealing against the passage of fluids, any pneumatic connection between the two sides of the surface formed by the covering system according to the present disclosure is also substantially prevented; this may be advantageous in the event of differential air-conditioning or ventilation between two interior spaces of a vehicle that adjoin one another and are separated from one another by the surface.

In addition, it is conceivable that the sealing element 16 is fitted with a self-adhesive layer, which administers an adhesive bonding of the sealing element 16 with the surface elements 20, for example, in the recesses 24. By this means any inadvertent release of the sealing element 16 may substantially be prevented, wherein at the same time with the use of appropriate methods and tools a release of the sealing element 16 from the surface elements 20 that is considerably simpler with fewer residues is still achieved, for example in maintenance or repair scenarios, than can be conceived with conventional curing sealing compounds.

In an exemplary manner a longitudinal beam 26 is shown as a frame structure that extends approximately over the length of an aircraft cabin or another vehicle cabin, onto which marginal regions of surface elements 20 in the form of floor panels are laid down in order to be attached there. The reinforced marginal region of the surface elements 20 may, for example, correspond with the supporting surface of the longitudinal beam 26.

Figure 2B:
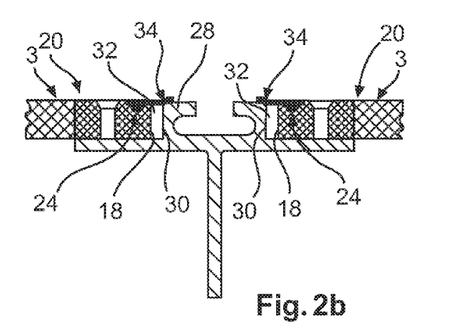

In another example, a surface element 20 can adjoin another structural component that is not embodied as a further surface element. FIG. 2b shows a surface element 20, which in each case laterally adjoins a seating rail beam 28 for passenger seats of a vehicle, wherein a gap 32 is formed in each case between the bounding edges 18 and the outer edges 30 of the seating rail beam 28; this gap 32 can be sealed by means of sealing elements 34. For this purpose marginal regions of the surface elements 20 have recesses 24, into which extend projections 22 of the sealing element 34, wherein an end of the sealing element 34 facing away from the projection 22 is formed such that it can fit snugly against a rail outer edge 30. By this means a substantially complete seal can be achieved. The sealing element 34, which in FIGS. 2a and 2b assumes a substantially planar form, could also be dimensioned such that a bead or similar is formed on the end opposite to the projection 22, and can be inserted into the gap 32. Alternatively or additionally, this end of the sealing element 34 is embodied so as to be self-adhesive, so that it can be attached to the rail outer edge 30.

Figure 2C:
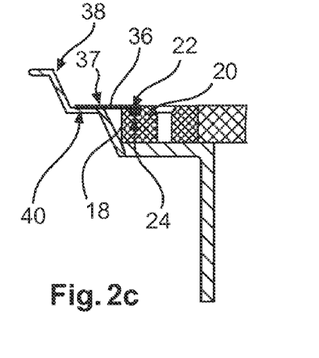
Figure 2D:
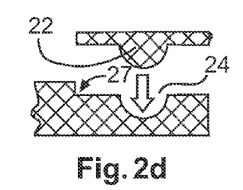
Figure 2E:
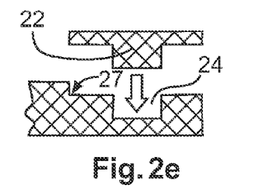
Figure 2F:
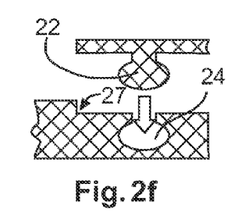
Figure 2G:
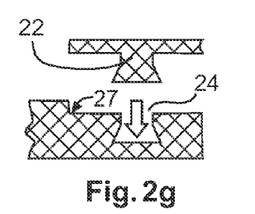

The same is true for an exemplary embodiment such as that in FIG. 2c, where a sealing element 36 extends from a recess 24 of a surface element 20 to a so-called foot angle 38, which in an aircraft, for example, forms a lateral cabin boundary. The sealing element 36 similarly has a projection 22, which engages in the recess 24 of the surface element 20. Thus a planar, sealed transition between the surface element 20 and the foot angle 38 may be achieved, wherein a region of the foot angle 38 may comprise a type of plateau 40, onto which a carpet or similar can in practice be laid to form the boundary of the cabin. The sealing element 36 may similarly have a self-adhesive end 37, which may then be attached onto the plateau 40 of the foot angle 38.

The detailed cross-sections in FIGS. 2d, 2e, 2f and 2g show various possible examples of configurations of recesses 24 and correspondingly shaped projections 22. While in FIG. 2d a purely convex projection 22 is represented, and the projection 22 in FIG. 2e has a purely rectangular shape, the projection 22 in FIG. 2f has the shape of a bead with an undercut, and in FIG. 2g it has a type of dovetail shape.

Figure 2H:
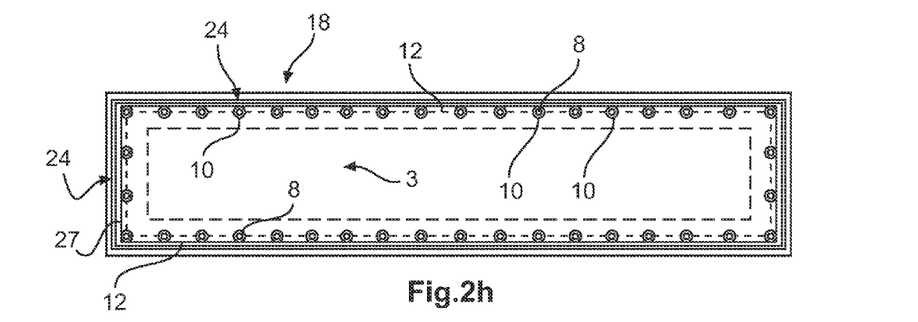

In order that the sealing elements are properly attachable to the surface elements, FIG. 2h shows in an exemplary manner a surface element 20, which in its marginal region comprises a recess 24, which forms a closed periphery. This means that no voids exist between any sections of the recess 24, through which fluids, foreign bodies or contamination may migrate, or through which a rapid equalization of pressure may take place. The intention is that sealing elements are arranged in all regions of the recess 24 so as to achieve a complete peripheral seal.

Figure 3A:
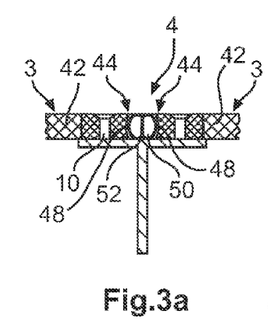
Figure 3B:
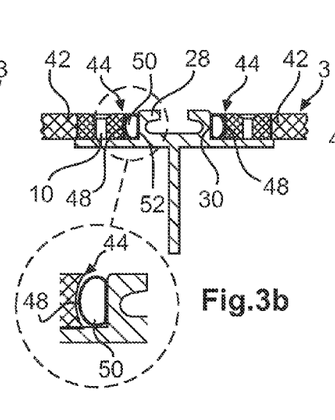
Figure 3C:
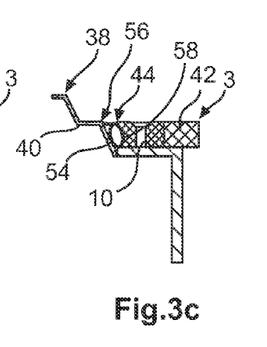

As represented in FIGS. 3a to 3c, sealing elements and recesses may also be configured in another manner. FIG. 3a shows, for instance, two surface elements 42 spaced apart from one another, which comprise bounding edges 44 directed towards one another, which enclose a gap 4. The bounding edges comprise a recess 48, which in each case has a concave form. This means that the recesses in each case curve from the outer bounding edge 44 inwards into the surface element 42. Two sealing elements 50 in FIG. 3a are embodied in an exemplary manner as closed and compressible hollow profiles, the cross sections of which are configured so as to correspond with the recesses 48. By this means the sealing elements 50 may fit snugly flush against the respective recesses 48, such that they cannot slip out. FIG. 3a shows in an exemplary manner two asymmetric sealing elements 50 for use in a gap 4; in each case these have one straight surface and one convex bounding surface, the shapes of which correspond with the bounding edges 48 and are located against one another on closure surfaces 52 facing towards one another. In the unloaded state it is conceivable that the two sealing elements 50 possess a symmetrical oval shape.

FIG. 3b shows that a single sealing element 50 with a configuration such as that in FIG. 3a may be deployed between a concave recess 48 embodied in a bounding edge 44 and a rail outer edge 30 of a seating rail body 28. In this representation it is also obvious that the sealing element 50 as represented may have a certain compressibility for it to be able to be introduced at all into the intermediate space between the recess 48 and the side face 30 of the seating rail 28. Accordingly the sealing element 50 generally includes an elastic material, for example an elastomer, such that it can be plugged into the intermediate space. As a result of the subsequent expansive readjustment of the sealing element 50 it fits snugly between the recess 48 and the rail outer edge 30.

For purposes of sealing onto a foot angle 38 or similar, FIG. 3c shows that a sealing element 54 in the unloaded state could have an oval cross-section. On an upper face of the sealing element 54 a closure strip 56 may be arranged in the form of an extension, which extends from an upper face of the sealing element 54 to the foot angle 38. The end of this extension in the form of a strip is generally embodied so as to be self-adhesive, so that it may be fixed onto the foot angle 38 and generally onto its plateau 40.

Figures 4A, 4B:
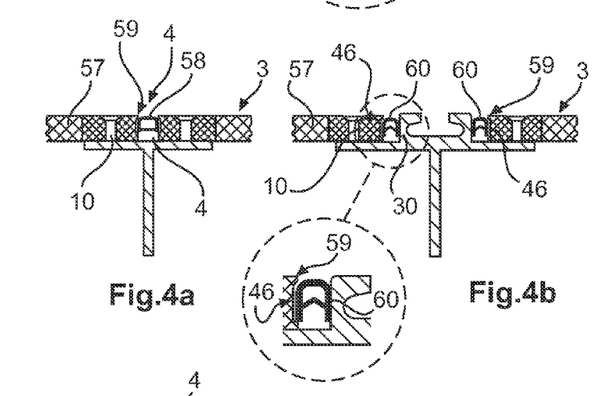
Figure 4C:
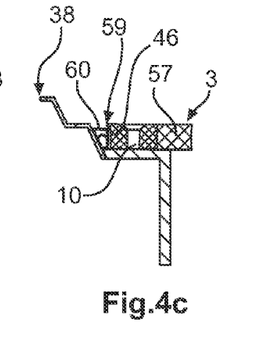

In accordance with alternative variants such as those represented in FIGS. 4a to 4c, sealing elements 58 and 60 with non-circular hollow profiles can also be deployed; in the case of bounding edges 59 of two adjacent surface elements 57 facing towards one another these profiles can also be embodied in one piece. In FIG. 4a, for example, a sealing element 58 of an elastic material is shown with a U-shaped cross-section; this has a web between the two arms of the U-profile. By compressing the sealing element 58 it can be made smaller and can thus fit exactly into a gap 4; there it can expand once again and bring about a sealing action. For purposes of securing the sealing element 58 the bounding edge 59 has a predominantly rectangular recess 46, into which the expanded sealing element 58 fits snugly. In FIG. 4b is shown a somewhat narrower variant in the form of a sealing element 60 between the seating rail edge 30 and the surface element 57; as can be seen in FIG. 4c, this can also be asymmetrically deformed and installed between the surface element 57 and a foot angle 38.

Figures 5A, 5B:
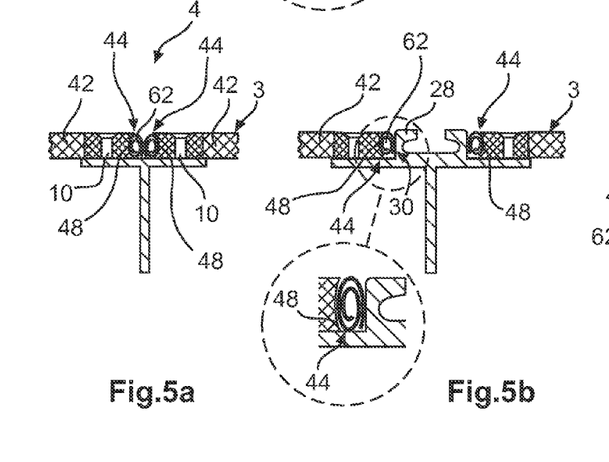
Figure 5C:
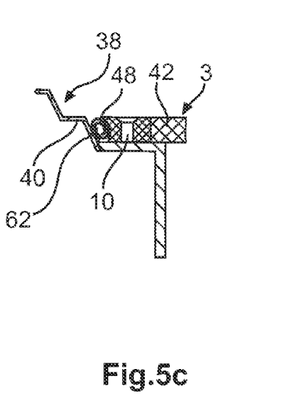

A sealing element 62 represented in FIGS. 5a to 5c corresponds essentially in its function to the sealing element 50 from FIGS. 3a to 3c. However, the round shape is manufactured such that instead of a closed hollow profile an elastic body in the form of a strip is rolled up and inserted into the gaps to be sealed. Thanks to an elastic material's attempt to reassume its original shape the sealing element 50 attempts to unroll once again. By this means it can fit substantially snugly against the recess 48 or against an adjacent sealing element 50. As FIG. 5b shows, use of such a sealing element 62 in the form of a strip on its own between a seating rail edge 30 and a recess 48 is also possible, as it also is between a recess 48 and a foot angle 38, as long as it remains guaranteed that the free, unrolling end is positioned such that total unrolling is prevented by means of a clamping action.

Figure 6A:
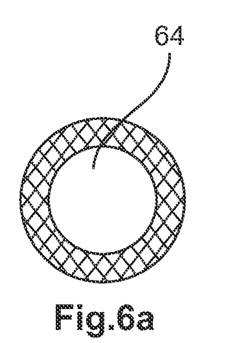
Figure 6B:
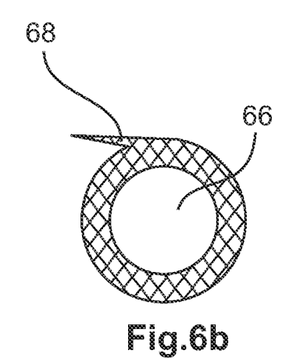
Figure 6C:
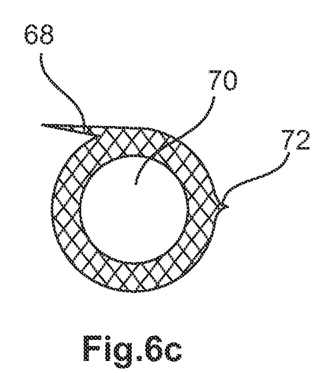
Figure 6D:
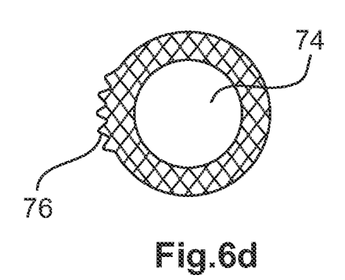
Figure 6E:
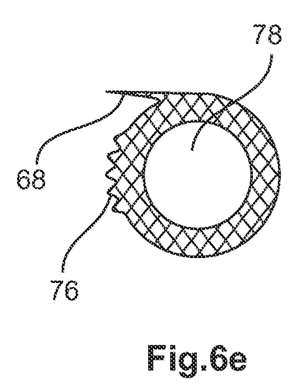
Figure 6F:
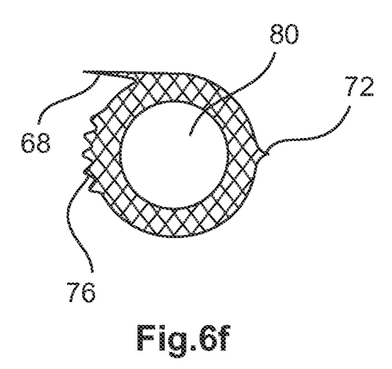

In accordance with FIGS. 6a to 6f, tubular profiles with a closed cross-section can be deployed; these substantially correspond to the sealing elements from FIGS. 3a-3c. These profiles can be embodied in the form of a completely smooth tubular body 64 (FIG. 6a). For purposes of attachment or bridging a gap a tubular body 66 can also have an extension 68 in the form of a strip on an upper surface, which is generally embodied so as to be self-adhesive (FIG. 6b). In addition a tubular body 70 could have a sealing lip 72 on a lateral surface, which is spaced apart from the extension 68 in the form of a strip (FIG. 6c). As an alternative to this a tubular body 74 could also have a plurality of sealing lips 76 on a lateral face, spaced apart from one another and running substantially parallel to one another; these bring about a substantially good sealing action (FIG. 6d). Self-evidently combinations in the form of tubular bodies 78 with an extension 68 in the form of a strip and sealing lips (FIG. 6e), and tubular bodies 80 with an extension 68 in the form of a strip, a plurality of sealing lips 76 on one face and a single sealing lip 72 on an opposite face (FIG. 6f) are also possible.

The sealing elements 66, 70, 74, 78 and 80 could be deployed in an alternative covering system, which is modified such that instead of a recess on the surface element other means of positioning, means of holding, means of guidance or means of attachment are also deployed; in combination with an appropriately configured sealing element these can produce a reliable seal that can be mechanically loaded. For example, the adjacent surface element or an adjacent structural component surface could be substantially smooth, i.e. planar, wherein, for example, a projection 72 or sealing lips 76 fit snugly against or press against this smooth bounding surface. As a result of the force thereby acting, static friction is generated, which prevents the corresponding sealing element from slipping out, and at the same time forms a barrier against the passage of contaminants or fluids. An extension 68 could also be used for the purpose of inserting a sealing element between adjacent smooth bounding surfaces and holding it in position by adhesive bonding of the extension 68 to an upper surface of an adjacent surface element.

The recess of an adjacent surface element could furthermore be limited to a recess that is arranged on the upper surface of the surface element, projects as far as a lateral bounding surface, and is generally dimensioned such that the extension 68 lies flush with the upper surface of the surface element adjacent to the recess.

Figure 7A:
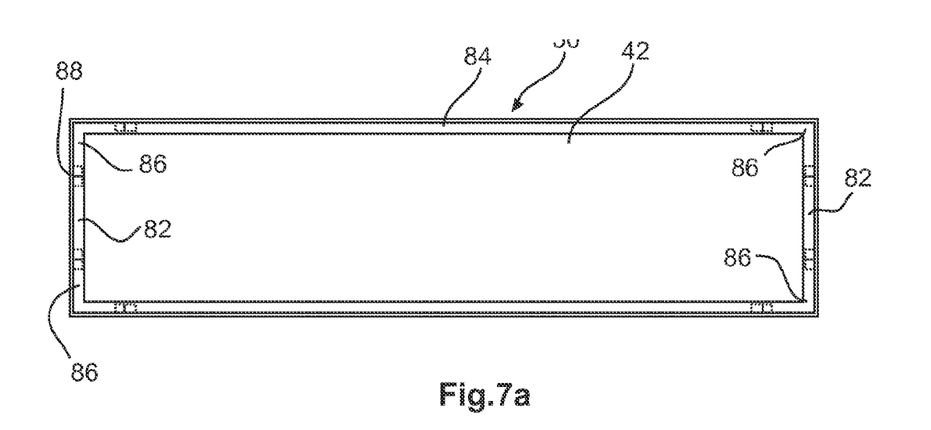
Figures 7B, 7C, 7E:
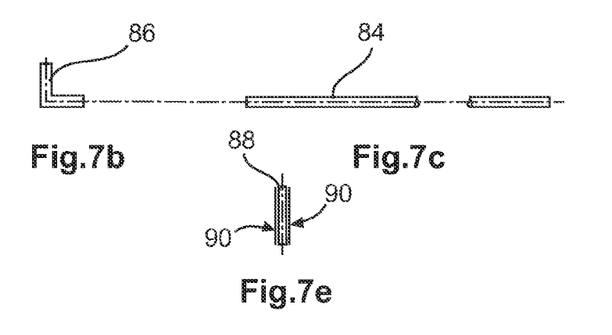
Figure 7D:
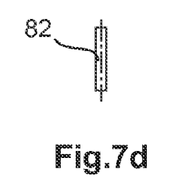

Sealing elements with hollow profiles can be used as continuous lengths that are cut to size, or as finished products, as is represented in the following FIGS. 7a to 7f. FIG. 7a shows in an exemplary manner a surface element 42 from FIGS. 3a to 3c, which is provided with a peripheral sealing element 50. This includes two shorter sealing element sections 82 for the shorter sides of the surface element 42, two longer sealing element sections 84 for the longer sides, four moulded parts 86 for the corners of the surface element 42 and a total of eight connecting bushings 88, which in each case connect the sealing element sections 82 and 84 with adjacent moulded parts 86. While the sealing element sections can generally be manufactured from an elastomer, the moulded parts 86 are generally produced as injection castings of a somewhat more robust, but nevertheless sufficiently elastic, plastic. With these the corners of the surface element 42 can be covered reliably.

This concept is represented in FIGS. 7b to 7e, with individual representations of the sealing element sections 82 and 84, the moulded parts 86 and the connecting bushings 88. The profile cross-sections of the sealing element sections 82 and 84 and the moulded parts 86 are identical, while the connecting bushings are formed such that they can be introduced into the sealing element sections 82 and 84 and the moulded parts 86. This can be achieved with a reduced cross-section. The connecting bushings 88 generally have an adhesive layer 90 for purposes of adhesive bonding with the components with which they are brought into engagement.

Figure 7F:
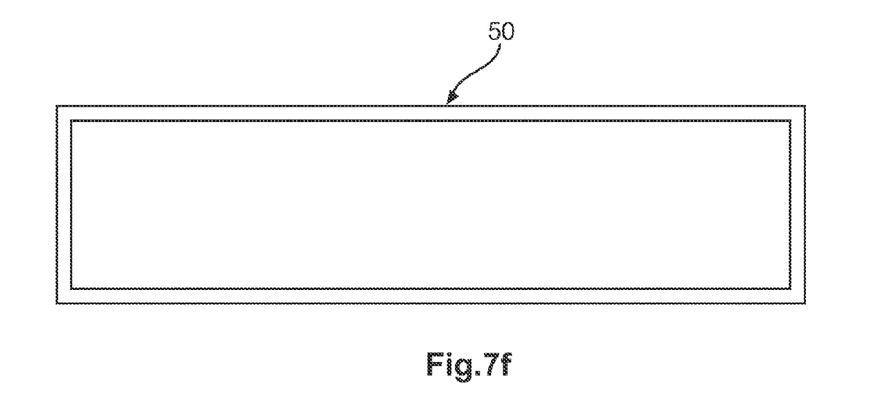

As an alternative to the variant in the form of individual pieces, a one-piece sealing element 50 in accordance with FIG. 7f can also be available, which after installation of surface elements 42 is inserted into the adjacent gaps.

Figure 8A:
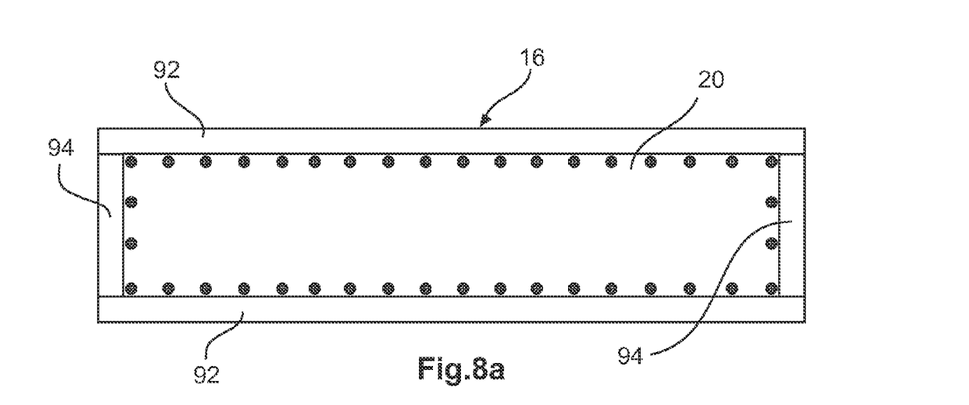
Figures 8B, 8C:
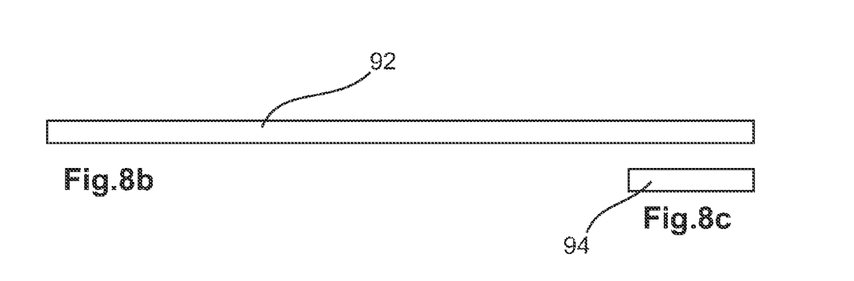
Figure 8D:
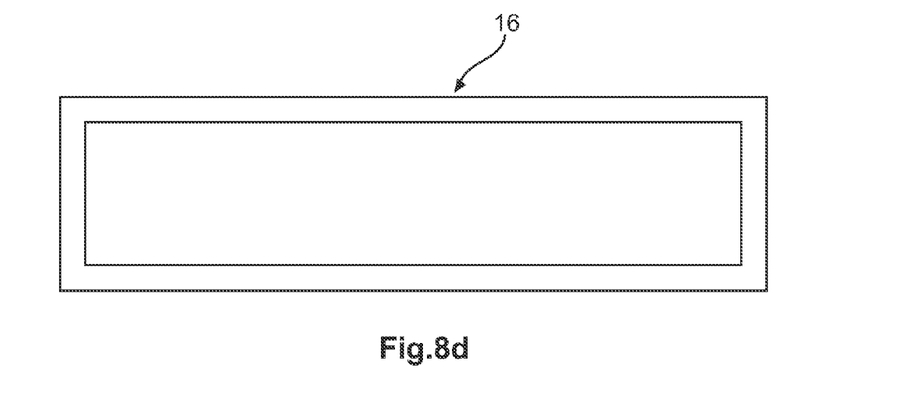

Planar sealing elements, which correspond approximately to the sealing element 16 shown in FIG. 2a, can similarly be used in the form of a number of pieces, or as one piece, as is shown in FIGS. 8a to 8d. For example, two of the already cut to length longer sealing element sections 92 shown in FIG. 8b can be inserted to seal the longer sides of the surface element 20, while two of the shorter sealing element sections 94 represented in FIG. 8c can be used to seal the shorter sides. The sealing element sections 92 and 94 should generally be configured such that they are located flush against one another. Self-evidently the sealing element sections 92 and 94 can also be taken from a continuous length of element and cut to size directly on site during the sealing procedure. FIG. 8d shows alternatively a completely finished sealing element 16, which prior to mounting already forms a peripheral closed cross-section and needs only to be pressed into position on the surface element 20.

Figure 9:
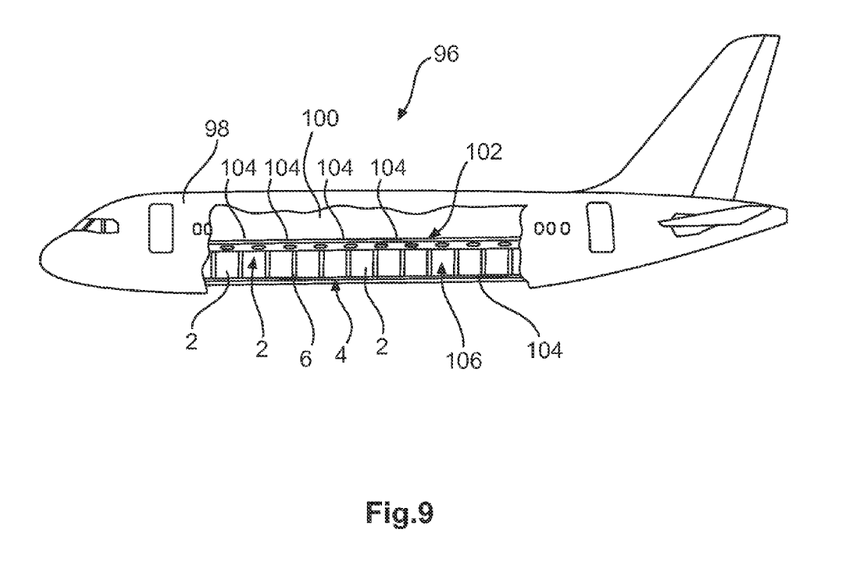
FIG. 9 shows in a schematic side cross-section an exemplary aircraft with an interior space formed by a fuselage structure and frame structure with a plurality of panels formed the covering system according to the various principles of the present disclosure.

FIG. 9 shows an aircraft 96 with an aircraft fuselage 98, an interior space designed therein in the form of a passenger cabin 100 with a floor 102 with a plurality of floor panels 104, which form gaps relative to one another and to seating rails and foot angles. The floor 102 is constructed with the covering system of the present disclosure, wherein the surface elements are embodied in the form of floor panels 104. Through the use of the sealing elements the floor 102 is sealed in the downwards direction.

Furthermore a further interior space is present as a freight compartment 106, which has floor panels 104, surface elements 2 embodied as lining panels on the side and on the ceiling, which together with sealing elements are embodied with the covering system of the present disclosure as a floor, a side lining and a ceiling lining. Installation and the sealing procedure takes place significantly faster than in the prior art and furthermore any de-installation is significantly accelerated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A covering system for an interior space of a vehicle, comprising:
    at least one surface element having an upper surface and at least one bounding edge extending at an angle to the upper surface and laterally delimiting the surface element, the surface element including at least one channel-like recess which runs at least adjacent to the bounding edge; and
    at least one elastic sealing element having a portion corresponding at least partly with the at least one bounding edge, and defining a shape corresponding in at least some regions with the recess of the surface element, the sealing element being realized as a static, contacting seal, which does not require curing of a pasty sealant in order to administer a sufficient sealing action for the purpose of sealing a gap.

2. The covering system of claim 1, wherein the recess of the surface element is arranged on its upper surface in a marginal region adjacent to the at least one bounding edge.

3. The covering system of claim 2, wherein the sealing element comprises a flat, planar shape, and, on a sealing surface directed towards the upper surface of the surface element, a projection is arranged and shaped in a corresponding manner to the recess.

4. The covering system of claim 3, wherein the projection engages the recess.

5. The covering system of claim 2, wherein the recess is a groove or channel.

6. The covering system of claim 3, wherein the recess has an undercut, and the projection of the sealing element has a widening form, which corresponds with the recess in that the projection is snappable into the recess using the elasticity of its material.

7. The covering system of claim 3, wherein the surface element further comprises attachment holes to allow the passage of means of attachment and the recess is arranged in a region between the attachment holes and a bounding edge that is in each case adjacent.

8. The covering system of claim 1, wherein the recess for the sealing element is arranged in the bounding edge.

9. The covering system of claim 8, wherein the recess comprises a concave shape.

10. The covering system of claim 9, wherein the sealing element further comprises a circular cross-section in at least some regions, the curvature of which correlates closely with the curvature of the recess.

11. The covering system of claim 10, wherein the sealing element further comprises a hollow profile.

12. The covering system of claim 10, wherein the sealing element is a rolled-up sealing element in the form of a strip.

13. The covering system of claim 1, wherein a sealing surface of the sealing element is self-adhesive.

14. A method for the manufacture of a floor in a vehicle, comprising:
    laying down one or more surface elements onto a frame structure, each surface element having an upper surface and at least one bounding edge extending at an angle to the upper surface and laterally delimiting the surface element, each surface element further including at least one channel-like recess;
    attaching the surface elements onto a frame structure with a formation of at least one gap relative to adjacent surface elements; and
    mounting of an elastic sealing element at least on the margin of the surface elements for purposes of bridging the gap, wherein the mounting is also executable before the laying down of the surface elements, the sealing element being realized as a static, contacting seal, which does not require curing of a pasty sealant in order to administer a sufficient sealing action for the purpose of sealing the gap.

15. A vehicle with a vehicle fuselage and a frame structure created therein, comprising:
    a plurality of surface elements couplable to the frame structure such that a gap is formed between adjacent ones of the plurality of surface elements, each of the plurality of surface elements having an upper surface and at least one bounding edge extending at an angle to the upper surface and laterally delimiting the surface element, wherein each of the surface elements includes at least one channel-like recess; and
    at least one elastic sealing element having a portion corresponding at least partly with the at least one bounding edge, the at least one sealing element couplable to adjacent ones of the plurality of surface elements to seal the gap, the sealing element being realized as a static, contacting seal, which does not require curing of a pasty sealant in order to administer a sufficient sealing action for the purpose of sealing the gap.

16. The vehicle of claim 14, wherein the sealing element is a rolled-up sealing element in the form of a strip.

17. The vehicle of claim 14, wherein a sealing surface of the sealing element is self-adhesive.

* * * * *